No. 758,037. PATENTED APR. 26, 1904.
E. B. ALLEN.
BUTTONHOLE CUTTING AND STITCHING MACHINE.
APPLICATION FILED SEPT. 30, 1903.
NO MODEL. 6 SHEETS—SHEET 1.

No. 758,037. PATENTED APR. 26, 1904.
E. B. ALLEN.
BUTTONHOLE CUTTING AND STITCHING MACHINE.
APPLICATION FILED SEPT. 30, 1903.
NO MODEL. 6 SHEETS—SHEET 3.

Fig. 3.

No. 758,037. PATENTED APR. 26, 1904.
E. B. ALLEN.
BUTTONHOLE CUTTING AND STITCHING MACHINE.
APPLICATION FILED SEPT. 30, 1903.
NO MODEL. 6 SHEETS—SHEET 4.

Witnesses
Inventor:
Edward B. Allen
By his Attorney

No. 758,037. PATENTED APR. 26, 1904.
E. B. ALLEN.
BUTTONHOLE CUTTING AND STITCHING MACHINE.
APPLICATION FILED SEPT. 30, 1903.
NO MODEL. 6 SHEETS—SHEET 6.

No. 758,037. Patented April 26, 1904.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE CUTTING AND STITCHING MACHINE.

SPECIFICATION forming part of Letters Patent No. 758,037, dated April 26, 1904.

Application filed September 30, 1903. Serial No. 175,150. (No model.)

*To all whom it may concern:*

Be it known that I, EDWARD B. ALLEN, a citizen of the United States, residing at Elizabeth, in the county of Union and State of New Jersey, have invented certain new and useful Improvements in Buttonhole Cutting and Stitching Machines, of which the following is a specification, reference being had therein to the accompanying drawings.

This invention relates to buttonhole cutting and stitching machines, and comprises certain improvements on the machines fully shown and described in United States Patents Nos. 734,794 and 736,471, the present invention relating more particularly to a buttonhole-cutting mechanism suitable for use in the machines of said patents in substitution of the cutting mechanisms therein shown and described.

In the present invention the buttonhole-cutter is given its cutting and return strokes by a continuously-rotating cam geared to a constantly-running shaft, preferably driven from the belt which runs to the driving-pulley of the machine, and with and from which cutter-actuating cam the cutter is automatically connected and disconnected by a coupling mechanism, which also operates to transfer or move the cutter into and out of cutting position. The said coupling and cutter-transferring mechanism is preferably actuated by a cam rotating with the cutter-operating cam and with which last-named cam the cutter is momentarily connected at times for the buttonhole-cutting operations, said coupling and cutter-transferring mechanism being idle during the stitching operations, but being controlled by the attendant, so that by releasing a suitable tripping lever or device it may be set into operation to perform its proper functions.

In the accompanying drawings.

Excepting as to the mechanism for operating the buttonhole-cutter the machine shown in the accompanying drawings is or may be, essentially, the same as the machine shown by United States Patent No. 736,471, granted August 18, 1903. The said machine comprises a base or bed plate 12 to be attached to a work bench or table and rigid with which is a work-support 13, these parts forming the stationary work-frame of the machine and on which work-frame is pivotally mounted the movable or traveling stitching-frame carrying the stitch-forming and feeding mechanisms, the stitch-forming devices being adapted for periodical rotation, as in the machine of said Patent No. 736,471 and the machine of Patent No. 734,704, hereinbefore referred to. The driving-shaft 15 is provided with a pulley 16, having a clutch connection with said shaft and which clutch connection is controlled by a lever 17, pivotally mounted on a bracket 11, attached to the stitching-frame 14 and carrying a spring-pressed plunger 18, these parts, with their connections, constituting the start and stop motion mechanism of the machine.

The buttonhole-cutter of the present machine is like that of the machine of Patent No. 736,471 in that it comprises a base-plate or foot-piece 19, adapted to slide back and forth horizontally on the stationary work-support or frame and in which base-plate or foot-piece is formed the die or throat constituting the lower member of the cutting device. Rising from the base-plate 19 is a hollow standard 20, in which is mounted for vertical movements the cutter-bar 21, carrying the cutter 22. Rigid with the work-support is a steadying and guiding plate 10, having a right-angular slot 23, entered by a pin or roller-stud 24, carried by a cap-plate 25, fixed to an arm 26 preferably integral with and extending forward from the cutter-bar 21 and to which arm the knife or buttonhole-cutter 22 is attached by a set-screw 27.

Depending from the traveling stitching-frame 14 is a bracket 28, in which is journaled one part or member of an independent shaft provided with a pulley 29, which may be driven by the same belt which runs the driving-pulley 16 on the main shaft of the machine or by a separate belt. The said independent shaft comprises the parts or members 30, 31, and 32. The member 30 is formed partly hollow and is entered by the part or member 31, having a splined connection with said member or part 30, this construction affording a sliding or telescopic connection between the said parts 30 and 31. The part 31 is connected by a universal joint 33 with the rear end of the part 32, which latter is journaled in a bracket 34, attached to the base-plate 12 and carrying at its forward end a bevel-pinion 35, meshing with a bevel-gear 36, formed on a cam device or cam-wheel 37, journaled on a stud 38, screwed into the base-plate 12. Owing to the flexible connection between the parts 31 and 32 afforded by the universal joint 33 and to the sliding or telescopic connection between the parts 30 and 31, the independent cutter-operating shaft, comprising the said parts or members 30, 31, and 32, may be supported partly by the movable stitching-frame and partly by the stationary work-frame, as described, and still be free to run without binding, as will be understood.

Figure 1:
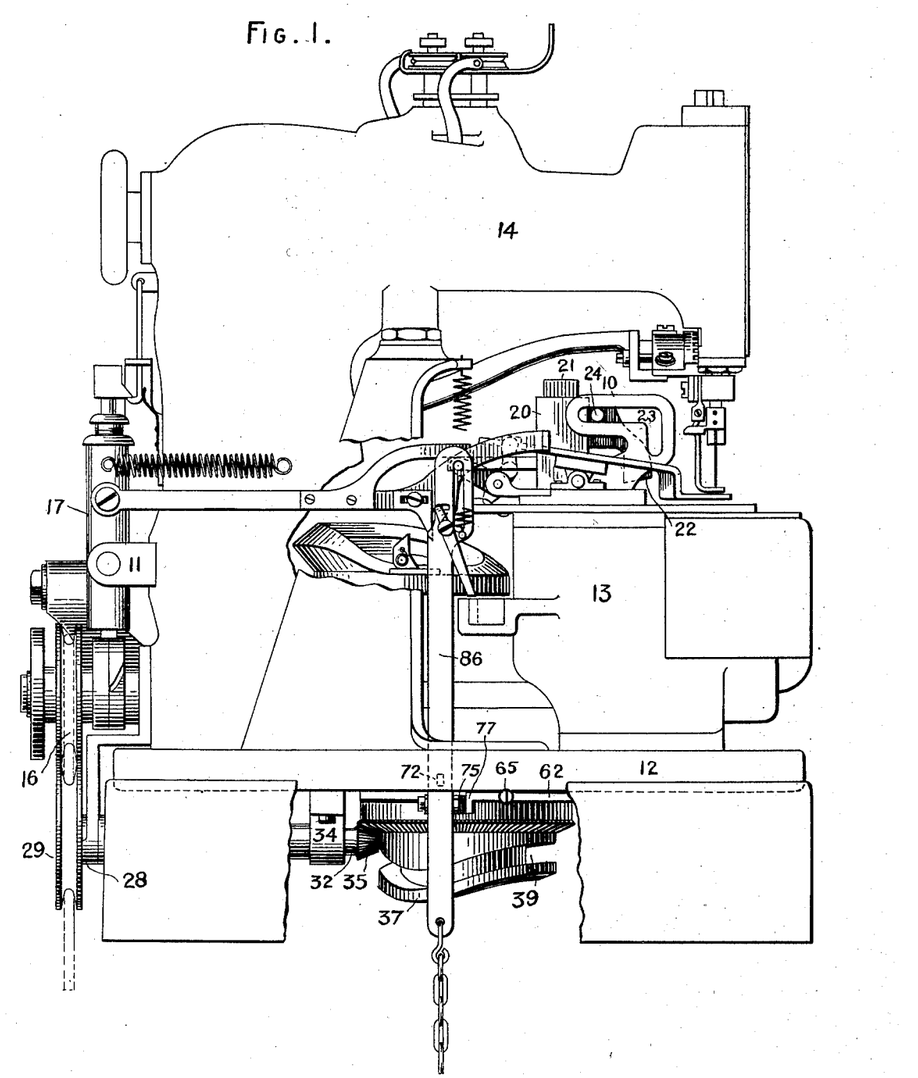
Figure 1 is a side view, partly broken out, of a buttonhole-machine embodying the present invention.
Figure 2:
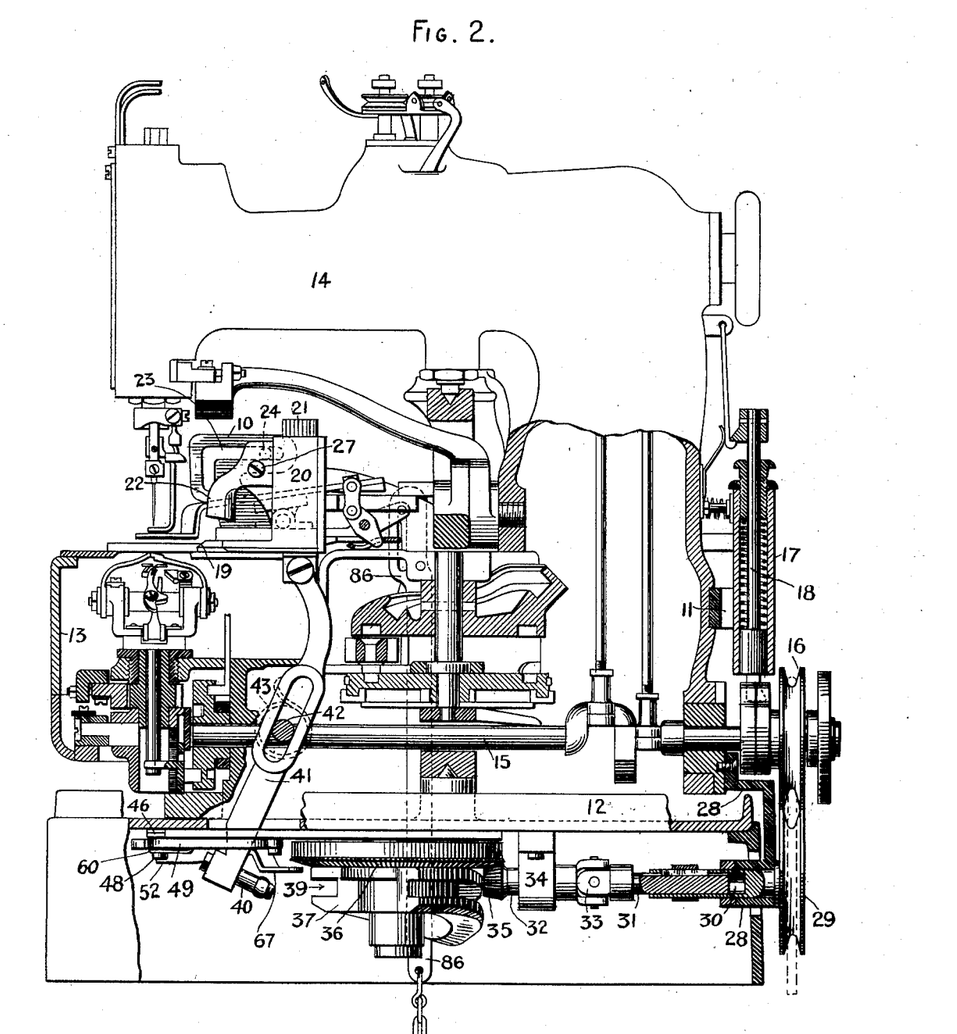
Fig. 2 is a side view, partly in vertical section, looking at the machine from the side opposite that shown in Fig. 1.
Figures 7, 8, 9, 10, 16:
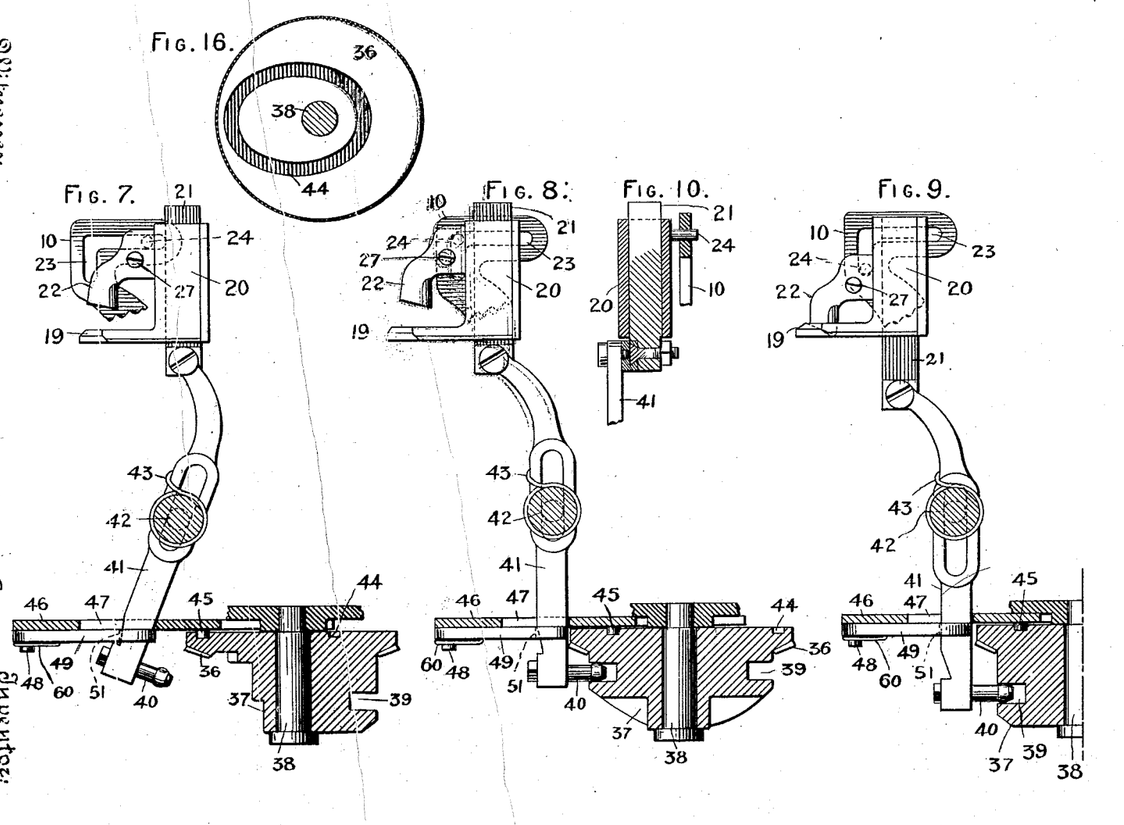
Figs. 7, 8, and 9 are sectional side views with the parts in different positions of the cutter and its operating mechanism.
Fig. 10 is a detail sectional view of the cutter bar or carrier and some connected parts.
Fig. 16 is a plan view of the cutter-operating cam.

The cam-wheel 37 is provided with a peripheral-grooved cam 39, engaged at times by a pin or roller-stud 40, carried at the lower end of a pitman-lever 41, having a slotted middle portion embracing a fulcrum pin or stud 42 on the stitching-frame 14, said pitman-lever being jointed at its upper end to the cutter-bar 21. The grooved cam 39 is preferably partly cut away at its periphery, as shown, for lightness. Surrounding the hub of the fulcrum-stud 42 is a coil-spring 43, the stress of which serves to hold the cutting device (the connected members of which are movable toward and from the needles of the machine) in its inoperative position, (shown in Figs. 1, 2, and 7,) and when the said cutting device is in such inoperative position the roller-stud 24 will be in the horizontal part of the slot 23 to hold the cutter-bar 21 and connected parts in raised position after they have been lifted by the grooved cutter-operating cam 39 and when the roller-stud 40 on the pitman-lever 41 has been withdrawn from said cam. The said slot in coöperation with the roller-stud 24 also serves to steady and guide the cutter-bar and cutter in their horizontal and vertical movements.

Figure 3:
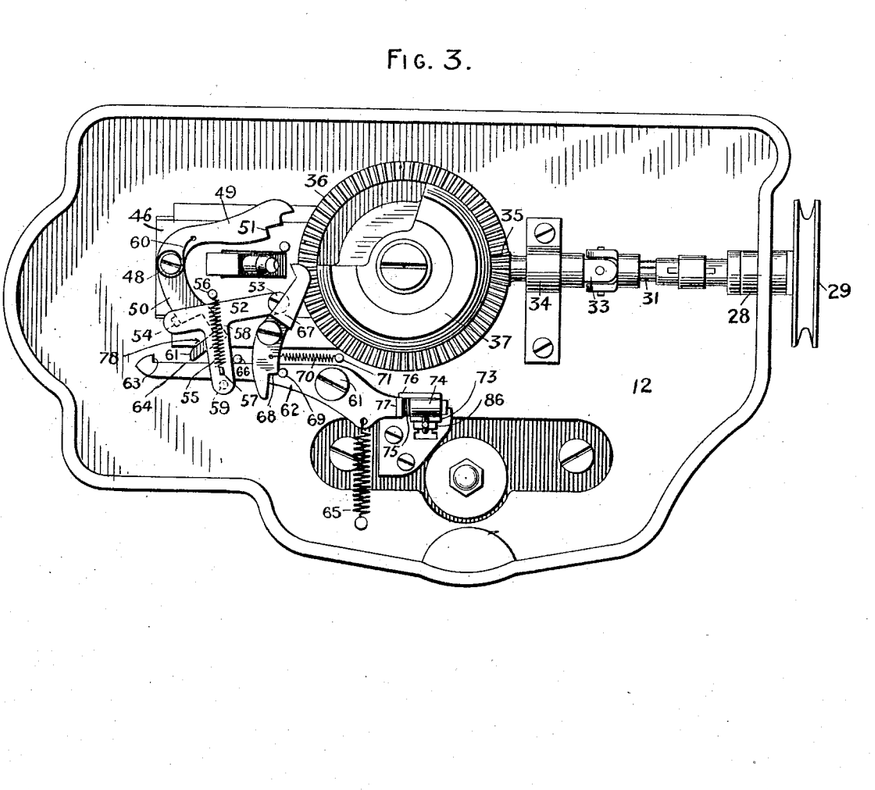
Fig. 3 is a bottom view of the machine.
Figure 4:
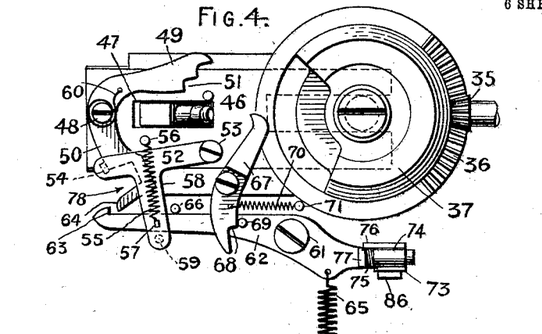
Figs. 4, 5, and 6 are detail bottom views with the parts in different positions of a part of the cutter-operating mechanism.

The upper face of the cam-wheel 37 is provided with a cam-groove 44, entered by a stud 45, depending from a sliding plate or slide 46, movable horizontally lengthwise of the machine in ways beneath the base-plate 12, said slide being provided with a slot 47, through which the lower end of the pitman-lever 41 extends and which slot is of sufficient length to permit said slide to reciprocate idly back and forth without engaging said pitman excepting when the latter is coupled thereto. Pivotally attached to the slide 46 by the screw 48 is an angular coupling-lever comprising the arms 49 and 50. The arm 49 is so constructed and arranged that when moved inward from the position shown in Figs. 3 and 4 to the position shown in Figs. 5 and 6 it will partly lie across the slot 47 in the slide 46 in such a manner that a shoulder 51 on said arm will engage the pitman-lever 41. In other words, the said coupling-lever when moved inward to the position shown in Figs. 5 and 6 will practically shorten the said slot 47, so that the said slide 46 cannot move without moving the said pitman-lever horizontally on its fulcrum pin or stud 42; but when the said coupling-lever is in the position shown in Figs. 3 and 4 and the pitman-lever has been moved to the position shown in Figs. 2 and 7 the said slide will be free to reciprocate idly without imparting any movement to said pitman-lever.

The coupling-lever is normally held in the idle position (shown in Figs. 3 and 4) by a retaining-lever 52, pivotally attached to the slide 46 by a screw 53 and having on its upper side a lug 54, engaging the arm 50 of the said coupling-lever, and which lug is pressed against the outer face of said arm by a spring 55, attached at one end to a pin 56 on said slide 46 and at the other end to a pin or hook 57 on the lateral arm 58 of the said retaining-lever and which arm is provided with a tripping pin or lug 59. When the retaining-lever is tripped, as will presently be described, the spring 60 will move the coupling-lever to its coupling position. (Shown in Figs. 5 and 6.)

Attached to the bed-plate 12 by a screw 61 is a tripping-lever 62, having at its forward end a hook 63, arranged for engagement with a tailpiece 64 on the arm 50 of the coupling-lever. A coil-spring 65, connected with the rear arm of the said tripping-lever and with the bed-plate 12, normally tends to hold the forward arm thereof against a stop-pin 66 on the said bed-plate. Pivotally attached to the bed-plate 12 is a latch-lever 67, the inner end of which is arranged to extend across the path of horizontal movement of the lower end of the pitman-lever 41 and the outer arm of which is provided with a shoulder 68 for engagement with a pin 69 on the tripping-lever 62. A spring 70, connected with the said latch-lever and with a stationary pin 71, normally tends to pull the outer arm of said latch-lever rearward, and thus force the inner arm thereof forward.

Figure 5:
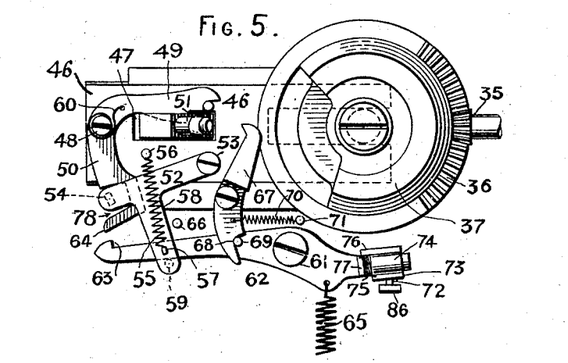
Figure 6:
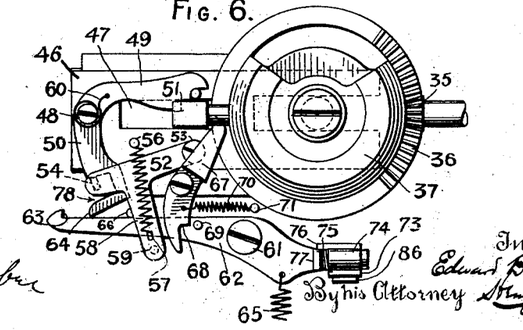
Figures 11, 12, 13:
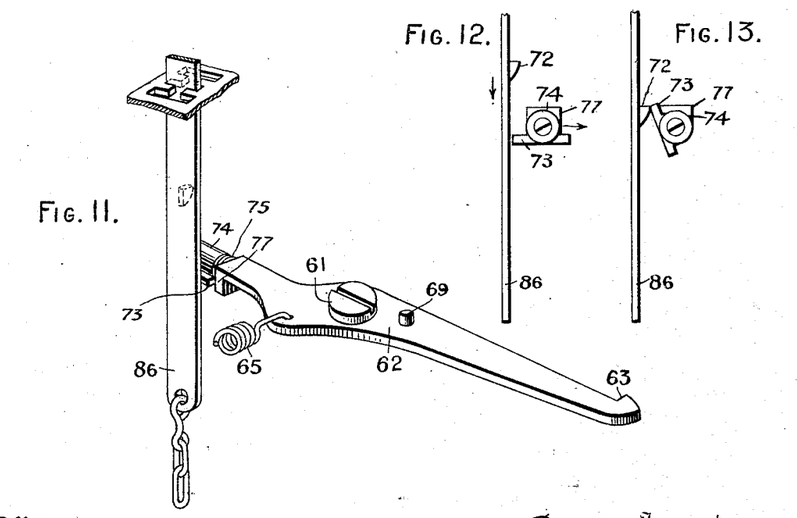
Fig. 11 is a perspective view of the tripping-lever and a part of the treadle-rod.
Figs. 12, 13, and 14 are detail views of some of the parts shown in Fig. 11.
Figure 14:
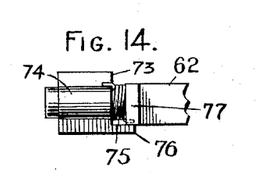
Figure 15:
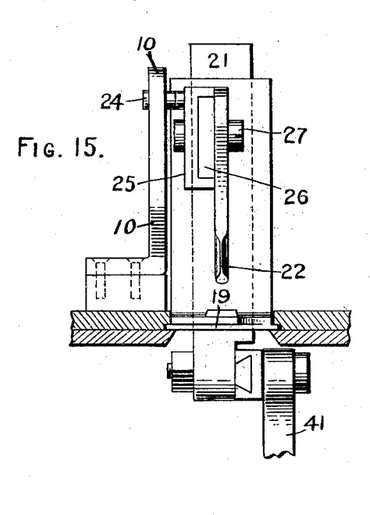
Fig. 15 is a detail front view showing the cutting device and its coöperating guide plate or bracket.

In the present machine the clamp is closed by the depression of a treadle-rod 86, as in the machine of United States Patent No. 736,471 hereinbefore referred to. This treadle-rod 86 is now provided with an inclined lug 72, which when said treadle-rod is depressed engages a lip 73 on a pivoted dog 74, mounted on the rear end of the tripping-lever 62. Said dog 74 is acted on by a coil-spring 75, so that it will yield against the stress of said spring in one direction only, a lug or projection 76 on said dog engaging a shoulder or part 77 of said lever and against which shoulder said lug is held by said spring, limiting the turning movement of said dog in the other direction. Thus when the treadle-rod 86 (which moves vertically in a suitable guideway in the base-plate 12) is depressed by the attendant to close the work-clamp the inclined lug 72 on said rod will engage the lip 73 of the pivoted dog 74, and thus move the rear end of said lever inward against the stress of the spring 65, causing an outward movement of the forward arm of said lever against the tripping pin or lug on the retaining-lever 52 to release the retaining-lug 54 from its holding engagement with the arm 50 of the coupling-lever and moving said lug into the notch or opening 78 of said arm, thus freeing the said coupling-lever, so that its spring 60 will move it into coupling position, as shown in Figs. 5 and 6. When the attendant releases the treadle-rod, it will be raised by its lifting-spring, (not shown,) and in this upward movement of the treadle-rod the dog 74 will yield, as shown in Fig. 13, to permit the lug 72 to pass idly by the lip 73.

The operation of the machine is as follows: Power being applied through a suitable driving belt or belts running to the pulleys 16 and 29, the cam device or cam-wheel 37, geared to the continuously-running shaft driven by the pulley 29, will be in constant rotation. The attendant having adjusted the work depresses the treadle-rod 86 to close the work-clamp, and such depression of the treadle-rod moves the tripping-lever 62 and releases the retaining-lever 52, thus leaving the coupling-lever free to be moved to coupling position by its spring 60, as has been described. The slide 46, operated from the continuously-running cam-wheel 37, is in constant reciprocation, and at the completion of its first forward or outward movement after the retaining-lever has been tripped the said coupling-lever is moved to coupling position (shown in Figs. 4 and 5) and engages the pitman-lever 41, thus carrying the lower end of said pitman-lever inward to cause the pin or roller-stud 40 on said pitman-lever to be in position to engage the grooved cam 39. The inward or rearward movement of the lower end of the pitman-lever causes a corresponding outward or forward movement of the upper end thereof, and as the said upper end is jointed to the cutter-bar the connected cutting members will be forced forward toward the needles to cutting position, and the grooved cam 39 will now draw down the pitman-lever to depress the cutter to cut the material and then immediately lift these parts to their raised positions, the slide 46, owing to a "dwell" in its operating-cam, remaining momentarily stationary while the cutting operation is being effected, and when this has been done the next outward throw of the said slide carries the lower end of the pitman-lever forward to disengage its roller-stud from the cam 39 and its upper end rearward to move the cutting device rearward or away from the needles to its first position. At this outward movement of the slide the wall at the rear end of the slot 47 engages the pitman-lever to effect its horizontal movement on its fulcrum-pin. When the tripping-lever 62 is moved to tripping position, as shown in Fig. 6, the latch-lever 67 is moved by its spring 70 so that its shoulder 68 will engage the pin 69 on the said tripping-lever, and thus momentarily hold said lever in tripping position until said latch-lever is released from said pin. Such release of the latch-lever is effected by the inward movement of the pitman-lever, across the horizontal path of movement of which the inner end of said latch-lever extends, so that the said latch-lever is disengaged from said pin 69, as shown in Fig. 6. When the tripping-lever is thus freed from said latch-lever, its forward end is moved inward by the spring 65 against the stop-pin 66, so that its hook 63 is then in the path of movement of the tailpiece 64 on the coupling-lever mounted on the reciprocating slide 46, and thus as said slide moves outward said tailpiece will come into engagement with said hook, thereby uncoupling or disengaging the coupling-lever from the pitman-lever and moving said coupling-lever to such position that the retaining-lever 52, acted on by its spring 55, will be moved to cause the retaining-lug 54 to engage the arm 50 of the coupling-lever, and thus hold said coupling-lever in an idle or inoperative position until it is again tripped by the depression of the treadle-rod for the next buttonhole-cutting operation. The spring 55 is sufficiently strong to more than overcome the stress of the spring 60, so that the lug 54 will under the stress of the said spring 55 be drawn against the inclined outer face of the arm 50 of the coupling-lever in such a manner as to hold the tailpiece 64 far enough inward so that it will not come in contact with the hook 63 of the tripping-lever as the said tailpiece reciprocates idly with the slide 46, and thus any clicking noise due to contact of these parts during the idle movements of the said slide will be avoided.

It will be observed that the pitman-lever 41 affords a single connection between the two cams or cam-grooves from which are imparted the back-and-forth transferring movements to the connected members of the cutting device and the reciprocating cutting movements to the cutter, thus contributing to simplicity of construction and ease of operation in the class of machines to which this invention relates. The path of movement imparted to the cutter-bar and cutter by the pitman-lever corresponds to the shape of the steadying and guiding slot 23 in the standard 10 entered by the pin or roller-stud 24—that is to say, the cutting member of the cutting device when a cutting operation is to take place will have a continuous motion imparted to it from the pitman-lever, such continuous motion comprising first a straight horizontal movement, then a slight downward curve, and then a straight vertical movement—the path of this continuous motion being reversed when the cutting device is restored to its first or idle position.

After a buttonhole has been cut the stitch-forming mechanism will be set into operation by releasing the stop-motion device in a manner similar to that described in United States Patent No. 736,471 or in any other suitable manner.

The present invention is not to be understood as being limited to the details of construction herein shown and described, as these may be varied widely without departing from the spirit of the invention.

Having thus described my invention, I claim and desire to secure by Letters Patent—

1. In a buttonhole cutting and stitching machine, the combination with a laterally or horizontally movable buttonhole-cutting device, of a continuously-moving operating device for transferring said cutting device laterally or horizontally into and out of cutting position and for operating the cutter, said cutting device being normally disconnected from said operating device, and a coupling mechanism for automatically connecting said cutting device with and disconnecting it from its said operating device.

2. In a buttonhole cutting and stitching machine, the combination with a continuously-rotating cutter-operating and cutter-transferring cam-wheel, of a buttonhole-cutting device normally disconnected from said cam-wheel, and a coupling mechanism for automatically connecting said cutter with and disconnecting it from said cam-wheel.

3. In a buttonhole cutting and stitching machine, the combination with a continuously-rotating shaft which is independent of the driving-shaft of the machine, of a cutter-operating cam device actuated from said independent shaft, a buttonhole-cutter normally disconnected from its operating cam device, and a coupling mechanism for automatically connecting said cutter with and disconnecting it from its operating cam device.

4. In a buttonhole cutting and stitching machine, the combination with a buttonhole-cutting device, of a cam for moving said cutting device into and out of cutting position, a cam for imparting cutting movements to the cutter, and a single connection between said cams and said cutting device.

5. In a buttonhole cutting and stitching machine, the combination with a cam wheel or device comprising two cams, of a buttonhole-cutting device normally disconnected from its operating-cams, a single connection through which said cams may transfer said cutting device into and out of cutting position and operate the moving member of the cutting device, and a coupling mechanism for automatically connecting said cutting device with and disconnecting it from its operating-cams.

6. In a buttonhole cutting and stitching machine, the combination with stitch-forming devices, an operating-shaft therefor, a stationary work-frame, and a movable stitching-frame, of a buttonhole-cutting device mounted on said work-frame, a continuously-rotating cam device, for operating said cutting device, also mounted on said work-frame, and a cutter-operating shaft, separate from the stitching-mechanism shaft, geared to said cam device.

7. In a buttonhole cutting and stitching machine, the combination with a stationary work-frame and a movable stitching-frame, of a buttonhole-cutting device mounted on said work-frame, a cam device for operating said cutting device, also mounted on said work-frame, and an independent cutter-operating shaft geared to said cam device, said shaft being partly mounted on said stitching-frame and partly on said work-frame and being formed in two or more parts having a flexible or universal joint connection.

8. In a buttonhole cutting and stitching machine, the combination with a buttonhole-cutting device, of a continuously-operating cam device from which said cutting device is normally disconnected, a pitman-lever for transferring the cutting device to and from cutting position and for operating the cutter, and an automatic coupling device for moving said pitman-lever into and out of operative engagement with said cam device.

9. In a buttonhole cutting and stitching machine, the combination with a buttonhole-cutting device, of a continuously-operating cam device from which said cutting device is normally disconnected, a pitman-lever for transferring the cutting device to and from cutting position, and a coupling device for moving said pitman-lever into and out of operative engagement with said cam device, said coupling device comprising a continuously-reciprocating slide, actuated from said cam device, and coupling mechanism carried by said slide.

10. In a buttonhole cutting and stitching machine, the combination with a buttonhole-cutting device, of a continuously-operating cam device from which said cutting device is normally disconnected, a pitman-lever for transferring the cutting device to and from cutting position, a coupling device for moving said pitman-lever into and out of operative engagement with said cam device, said coupling device comprising a continuously-reciprocating slide, actuated from said cam device, and coupling mechanism carried by said slide, and tripping mechanism for rendering said coupling mechanism operative and inoperative.

11. In a buttonhole cutting and stitching machine, the combination with a buttonhole-cutting device, of a continuously-operating cam device from which said cutting device is normally disconnected, a pitman-lever for transferring the cutting device to and from cutting position, and a coupling device for moving said pitman-lever into and out of operative engagement with said cam device, said coupling device comprising a continuously-reciprocating slide actuated from said cam device, a spring-actuated coupling-lever mounted on said slide, and a spring-actuated retaining-lever for said coupling-lever also mounted on said slide, and a tripping-lever, under the control of the attendant, for tripping said retaining-lever when the said pitman-lever is to be coupled to said cam device.

12. In a buttonhole cutting and stitching machine, the combination with a buttonhole-cutting device, of a continuously-operating cam device from which said cutting device is normally disconnected, a pitman-lever for transferring the cutting device to and from cutting position, a coupling device for moving said pitman-lever into and out of operative engagement with said cam device, said coupling device comprising a continuously-reciprocating slide actuated from said cam device, a spring-actuated retaining-lever for said coupling-lever also mounted on said slide, a tripping-lever under the control of the attendant, for tripping said retaining-lever when the said pitman-lever is to be coupled to said cam device, and a latch-lever for momentarily holding said tripping-lever inoperative, but which latch-lever is arranged to be engaged by said pitman-lever for releasing the tripping-lever.

13. In a buttonhole cutting and stitching machine, the combination with a continuously-rotating cam device, of a buttonhole-cutting device, a normally disconnected connection between said cam device and said cutting device, a coupling mechanism for operatively joining said normally disconnected connection with said cam device when the cutting device is to be operated, a tripping-lever for releasing said coupling mechanism when a buttonhole is to be cut, and a treadle-rod provided with means for operating said tripping-lever.

14. In a buttonhole cutting and stitching machine, the combination with a continuously-rotating cam device, of a buttonhole-cutting device, a normally disconnected connection between said cam device and said cutting device, a coupling mechanism for operatively joining said normally disconnected connection with said cam device when the cutting device is to be operated, a tripping-lever for releasing said coupling mechanism when a buttonhole is to be cut, and a treadle-rod provided with means for operating said tripping-lever, said means comprising an inclined lug on said treadle-rod coöperating with a spring-pressed dog with which said tripping-lever is provided 15. In a buttonhole cutting and stitching machine, the combination with a work-frame and a stitching-frame, one of which is movable relative to the other, of a continuously-rotating cutter-operating shaft, a continuously-rotating cutter-operating cam device mounted on one of said frames and geared to said shaft, a buttonhole-cutting device movably mounted relative to the stitching devices and normally disconnected from said cutter-operating cam device, and a coupling mechanism for connecting and disconnecting said cutting device and cutter-actuating cam device.

16. In a buttonhole cutting and stitching machine, the combination with a work-frame and a stitching-frame, one of which is movable relative to the other, of a continuously-rotating cutter-operating shaft, a continuously-rotating cutter-operating cam device mounted on one of said frames and geared to said shaft, a buttonhole-cutting device movably mounted relative to the stitching devices and normally disconnected from said cutter-operating cam device, and a coupling mechanism for connecting and disconnecting said cutting device and cutter-actuating cam device, said cutter-operating shaft being supported partly by one of said frames and partly by the other, and comprising a plurality of parts having a flexible or universal joint connection.

17. In a buttonhole cutting and stitching machine, the combination with a buttonhole-cutting device comprising upper and lower cutting members rigidly connected vertically so as to be movable in unison toward and from the stitch-forming devices of the machine, a continuously-rotating cutter-actuating cam device 37, a pitman-lever 41 for transferring the cutting device and for operating the cutter, and which pitman-lever is normally disconnected from said cutter-actuating cam device, a coupling mechanism serving to vibrate said pitman-lever on its fulcrum, for the purpose of moving the cutting device into and out of cutting position, and for operatively connecting said pitman-lever with the said cutter-actuating cam device for operating the cutter, and a tripping device by which a part of said coupling mechanism may be thrown into coupling position to engage said pitman-lever and thereby vibrate it on its fulcrum and move it into coupled connection with the said cutter-actuating cam device.

18. In a buttonhole cutting and stitching machine, the combination with a buttonhole-cutting device comprising upper and lower cutting members rigidly connected vertically so as to be movable in unison toward and from the stitch-forming devices of the machine, a continuously-rotating cutter-actuating cam device 37, a pitman-lever 41 for transferring the cutting device and for operating the cutter, and which pitman-lever is normally disconnected from said cutter-actuating cam device, a coupling mechanism serving to vibrate said pitman-lever on its fulcrum, for the purpose of moving the cutting device into and out of cutting position, and for operatively connecting said pitman-lever with the said cutter-actuating cam device for operating the cutter, and a tripping device by which a part of said coupling mechanism may be thrown into coupling position to engage said pitman-lever and thereby vibrate it on its fulcrum and move it into coupled connection with the said cutter-actuating cam device, said coupling mechanism comprising a continuously-reciprocating slide 46 operated from the cutter-actuating cam device, a spring-pressed coupling-lever 50, 51, mounted on said slide, and a spring-pressed retaining-lever 52, for said coupling-lever, also mounted on said slide.

19. In a buttonhole cutting and stitching machine, the combination with a buttonhole-cutting device comprising upper and lower cutting members rigidly connected vertically so as to be movable in unison toward and from the stitch-forming devices of the machine, a continuously-rotating cutter-actuating cam device 37, a pitman-lever 41 for transferring the cutting device and for operating the cutter, and which pitman-lever is normally disconnected from said cutter-actuating cam device, a coupling mechanism serving to vibrate said pitman-lever on its fulcrum, for the purpose of moving the cutting device into and out of cutting position, and for operatively connecting said pitman-lever with the said cutter-actuating cam device for operating the cutter, and a tripping device by which a part of said coupling mechanism may be thrown into coupling position to engage said pitman-lever and thereby vibrate it on its fulcrum and move it into coupled connection with the said cutter-actuating cam device, said coupling mechanism comprising a continuously-reciprocating slide 46 operated from the cutter-actuating cam device, a spring-pressed coupling-lever 50, 51, mounted on said slide, and a spring-pressed retaining-lever 52, for said coupling-lever, also mounted on said slide, and the said tripping device comprising a spring-pressed tripping-lever 62 mounted on a part which is stationary relative to said slide and provided with a hook 63, and the said coupling-lever being provided with a tailpiece 64 for coöperation with said hook when the said tripping-lever is in its operative position.

20. In a buttonhole cutting and stitching machine, the combination with a buttonhole-cutting device comprising upper and lower cutting members rigidly connected vertically so as to be movable in unison toward and from the stitch-forming devices of the machine, a continuously-rotating cutter-actuating cam device 37, a pitman-lever 41 for transferring the cutting device and for operating the cutter, and which pitman-lever is normally disconnected from said cutter-actuating cam device, a coupling mechanism serving to vibrate said pitman-lever on its fulcrum, for the purpose of moving the cutting device into and out of cutting position, and for operatively connecting said pitman-lever with the said cutter-actuating cam device for operating the cutter, a tripping device by which a part of said coupling mechanism may be thrown into coupling position to engage said pitman-lever and thereby vibrate it on its fulcrum and move it into coupled connection with the said cutter-actuating cam device, said coupling mechanism comprising a continuously-reciprocating slide 46 operated from the cutter-actuating cam device, a spring-pressed coupling-lever 50, 51, mounted on said slide, and a spring-pressed retaining-lever 52, for said coupling-lever, also mounted on said slide; and the said tripping device comprising a spring-pressed tripping-lever 62 mounted on a part which is stationary relative to said slide and provided with a hook 63, and the said coupling-lever being provided with a tailpiece 64 for coöperation with said hook when the said tripping-lever is in its operative position, and a treadle-rod having an inclined lug coöperating with a spring-pressed dog with which said tripping-lever is provided.

21. In a buttonhole cutting and stitching machine, the combination with a buttonhole-cutting device, of a cam device for moving said cutting device into and out of cutting position and for operating the cutter, and a pitman-lever connecting said cam device with said cutting device; said pitman-lever, in imparting transferring and cutting movements to the cutting device, at a cutting operation, giving a continuous movement to the cutting member, first in a straight horizontal path, then in a slight downward curve, and then in a straight vertical path, reversing this continuous movement in restoring the parts to first position.

22. In a buttonhole cutting and stitching machine, the combination with a buttonhole-cutting device, of a cam device for moving said cutting device into and out of cutting position and for operating the cutter, and a single connection between said cam device and said cutting device; said single connection, in imparting transferring and cutting movements to the cutting device at the cutting operation, giving a continuous movement to the cutting member, first in a straight horizontal path, then in a slight downward curve, and then in a straight vertical path, reversing this continuous movement in restoring the parts to first position.

In testimony whereof I affix my signature in presence of two witnesses.

EDWARD B. ALLEN.

Witnesses:
H. J. MILLER,
H. A. KORNEMANN.